United States Patent
Petty et al.

(10) Patent No.: US 10,982,565 B2
(45) Date of Patent: Apr. 20, 2021

(54) TURBINE CASE ADJUSTMENT USING ADJUSTABLE TIE RODS

(71) Applicant: United Technologies Corporation, Hartford, CT (US)

(72) Inventors: Dale William Petty, Wallingford, CT (US); James P. Allore, Manchester, CT (US); Joseph T. Caprario, Cromwell, CT (US); Steven J. Bauer, East Haddam, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1262 days.

(21) Appl. No.: 14/759,769

(22) PCT Filed: Jan. 21, 2013

(86) PCT No.: PCT/US2013/022384
§ 371 (c)(1),
(2) Date: Jul. 8, 2015

(87) PCT Pub. No.: WO2014/113034
PCT Pub. Date: Jul. 24, 2014

(65) Prior Publication Data
US 2015/0345337 A1    Dec. 3, 2015

(51) Int. Cl.
*F01D 25/28* (2006.01)
*F01D 25/24* (2006.01)
(Continued)

(52) U.S. Cl.
CPC ............ *F01D 25/28* (2013.01); *F01D 25/162* (2013.01); *F01D 25/24* (2013.01); *F01D 25/243* (2013.01);
(Continued)

(58) Field of Classification Search
CPC ........ F01D 25/28; F01D 25/162; F01D 25/24; F01D 25/246; F01D 25/26; F01D 25/243;
(Continued)

(56) References Cited

U.S. PATENT DOCUMENTS 3,004,388 A    10/1961  Foulon
4,478,551 A    10/1984  Honeycutt, Jr. et al.
(Continued)

FOREIGN PATENT DOCUMENTS

EP    2192270 A2    6/2010
EP    2511484 A2    10/2012

OTHER PUBLICATIONS

Supplementary European Search Report for European Application No. 13871789.7 dated Feb. 4, 2016.
International Preliminary Report on Patentability for International Application No. PCT/US2013/022384 dated Jul. 30, 2015.
The International Search Report and Written Opinion for PCT Application No. PCT/US2013/222384, dated Mar. 29, 2013.

*Primary Examiner* — Christopher Verdier
(74) *Attorney, Agent, or Firm* — Carlson, Gaskey & Olds, P.C.

(57) ABSTRACT

A turbine housing section includes a radially inner case centered on a first axis, and a radially outer case spaced radially outwardly of the inner case, and centered on a second axis. The first and second axes are offset relative to each other. A plurality of tie rods include a threaded nut received on a tie rod, with the plurality of tie rods connecting the inner and outer cases. The plurality of tie rods are spaced circumferentially about both of the first and second axes, and extend for distinct lengths between the inner and outer cases such that the inner and outer cases are held at a position wherein the first and second axes are offset.

14 Claims, 2 Drawing Sheets

(51) Int. Cl.
    *F01D 25/16*   (2006.01)
    *F01D 25/26*   (2006.01)
(52) U.S. Cl.
    CPC .......... *F01D 25/26* (2013.01); *B23P 2700/13* (2013.01); *F05D 2230/64* (2013.01); *F05D 2230/644* (2013.01); *Y10T 29/4932* (2015.01); *Y10T 29/49828* (2015.01); *Y10T 29/49948* (2015.01); *Y10T 29/49963* (2015.01)
(58) Field of Classification Search
    CPC ............... F01D 25/265; F05D 2230/64; F05D 2230/644; B23P 2700/13; Y10T 29/432; Y10T 29/49948; Y10T 29/49963; Y10T 29/4932
    USPC .................................................. 415/133, 142
    See application file for complete search history.

(56) References Cited

U.S. PATENT DOCUMENTS

| | | |
|---|---|---|
| 4,571,936 A | 2/1986 | Nash et al. |
| 4,821,758 A | 4/1989 | Ruis |
| 5,088,279 A | 2/1992 | MacGee |
| 2009/0060704 A1* | 3/2009 | Hurwitz ................ B64D 33/02 415/1 |
| 2009/0145136 A1 | 6/2009 | Norris et al. |
| 2010/0132371 A1* | 6/2010 | Durocher ................ F01D 9/065 60/796 |
| 2013/0011242 A1 | 1/2013 | Beeck et al. |

* cited by examiner

TURBINE CASE ADJUSTMENT USING ADJUSTABLE TIE RODS

BACKGROUND OF THE INVENTION

This application relates to a method and apparatus for adjusting a center line for a bearing mount relative to a turbine casing utilizing adjustable tie rods.

Gas turbine engines are known, and typically include a compressor compressing air and delivering it into a combustion section where it is mixed with fuel and ignited. Products of this combustion pass downstream over turbine rotors, driving them to rotate. The turbine rotors drive the compressor rotors.

In a gas turbine engine utilized on an aircraft, a fan typically delivers a portion of its air into a bypass duct, and a portion of air into the compressor. There are often two turbine rotors, and two compressor rotors. A first turbine rotor sees a higher pressure and rotates at a higher speed, and rotates a downstream or higher pressure compressor rotor. A second turbine rotor is downstream of the first, and thus sees a lower pressure and rotates at a lower speed than the first turbine rotor.

Historically, the lower pressure turbine drove the lower pressure compressor rotor and the fan at one speed. More recently, a gear reduction has been included between the fan and the low pressure turbine rotor, such that the fan and the low pressure compressor can be rotated at different speeds.

This development has led to freedom in the design of the turbine section. In one turbine section there is a mid-turbine casing or frame mounted between the low and higher pressure turbine rotors.

The mid-turbine casing includes an inner case and an outer case which are connected by threaded tie rods. A bearing is mounted within an inner bore in the inner case, and a turbine flow area is defined between an outer periphery of the inner case and an inner periphery of the outer turbine case.

For any number of reasons, it is often the case that a center line of the outer turbine case may desirably be offset from a center line of the bearing. This may occur due to a desire to optimize blade tip clearances within the engine. Further, the rotor may sag due to weight, deflection from maneuvers, and case distortion from thrust, pressure, temperature, and maneuvers. All of this may result in a nominal tip clearance being uneven around an engine circumference.

Thus, it is known to offset the bearing by machining the inner case bearing flanges to be nonconcentric with the outer case flanges. This requires a long lead time to coordinate manufacturing, additional offset tool setup, and is non-adjustable once machined.

SUMMARY OF THE INVENTION

In a featured embodiment, a turbine section has a turbine housing section including a radially inner case centered on a first axis, and a radially outer case spaced radially outwardly of the inner case, and centered on a second axis. The first and second axes are offset relative to each other. A plurality of tie rods includes a threaded nut received on a tie rod, with the plurality of tie rods connecting the inner and outer cases. The plurality of tie rods are spaced circumferentially about both of the first and second axes, and extend for distinct lengths between the inner and outer cases such that the inner and outer cases are held at a position wherein the first and second axes are offset.

In another embodiment according to the previous embodiment, the tie rods include a nut positioned radially outwardly of the outer case. The tie rods include a pin head positioned radially inwardly of the inner case. The nut is tightened on the tie rod to adjust the length of the tie rod and the distance between the inner and outer cases to adjust the location of the first and second axes.

In another embodiment according to any of the previous embodiments, a flange is positioned within the inner case to mount a bearing for mounting a turbine rotor, and such that a center line of the bearing will be offset from a center line of the outer case.

In another featured embodiment, a gas turbine engine has a fan and a compressor. The fan delivers air into the compressor, and into a bypass duct, a combustor section, and a first and second turbine rotor downstream of the combustion section. The first turbine rotor is positioned upstream of a second turbine rotor, and drives a first compressor rotor which is downstream of a second compressor rotor. The second turbine rotor drives the second compressor rotor and the fan. A gear reduction is positioned between the fan and the second turbine rotor. There is a mid-turbine frame positioned between the first and second turbine rotors to communicate products of combustion downstream of the first turbine rotor to the second turbine rotor. The mid-turbine frame includes a radially inner case centered on a first axis, and a radially outer case spaced radially outwardly of the inner case, and centered on a second axis. The first and second axes are offset relative to each other. A plurality of tie rods includes a threaded nut received on a tie rod. The plurality of tie rods connect the inner and outer cases. The plurality of tie rods are spaced circumferentially about both of the first and second axes, and extend for distinct lengths between the inner and outer cases such that the inner and outer cases are held at position wherein the first and second axes are offset.

In another embodiment according to the previous embodiment, the tie rods include a nut positioned radially outwardly of the outer case. The tie rods include a pin head positioned radially inwardly of the inner case. The nut is tightened on the tie rod to adjust the length of the tie rod and the distance between the inner and outer cases to adjust the location of the first and second axes.

In another embodiment according to any of the previous embodiments, a flange is positioned within the inner case to mount a bearing mounting the first turbine rotor, and such that a center line of the bearing will be offset from a center line of the outer case.

In another featured embodiment, a method of adjusting the location of a bearing in a turbine section includes the steps of connecting an inner turbine case to an outer turbine case with a plurality of tie rods with the tie rods secured with nuts between the inner and outer turbine cases. An offset is determined for a bearing to be mounted within the inner turbine case relative to a center line of the outer turbine case. The nuts are adjusted on the tie rods to move a center line of the inner turbine case relative to a center line of the outer turbine case to a desired location such that the bearing is at the desired location.

These and other features may be best understood from the following specification and drawings, the following which is a brief description.

DETAILED DESCRIPTION

Figure 1:
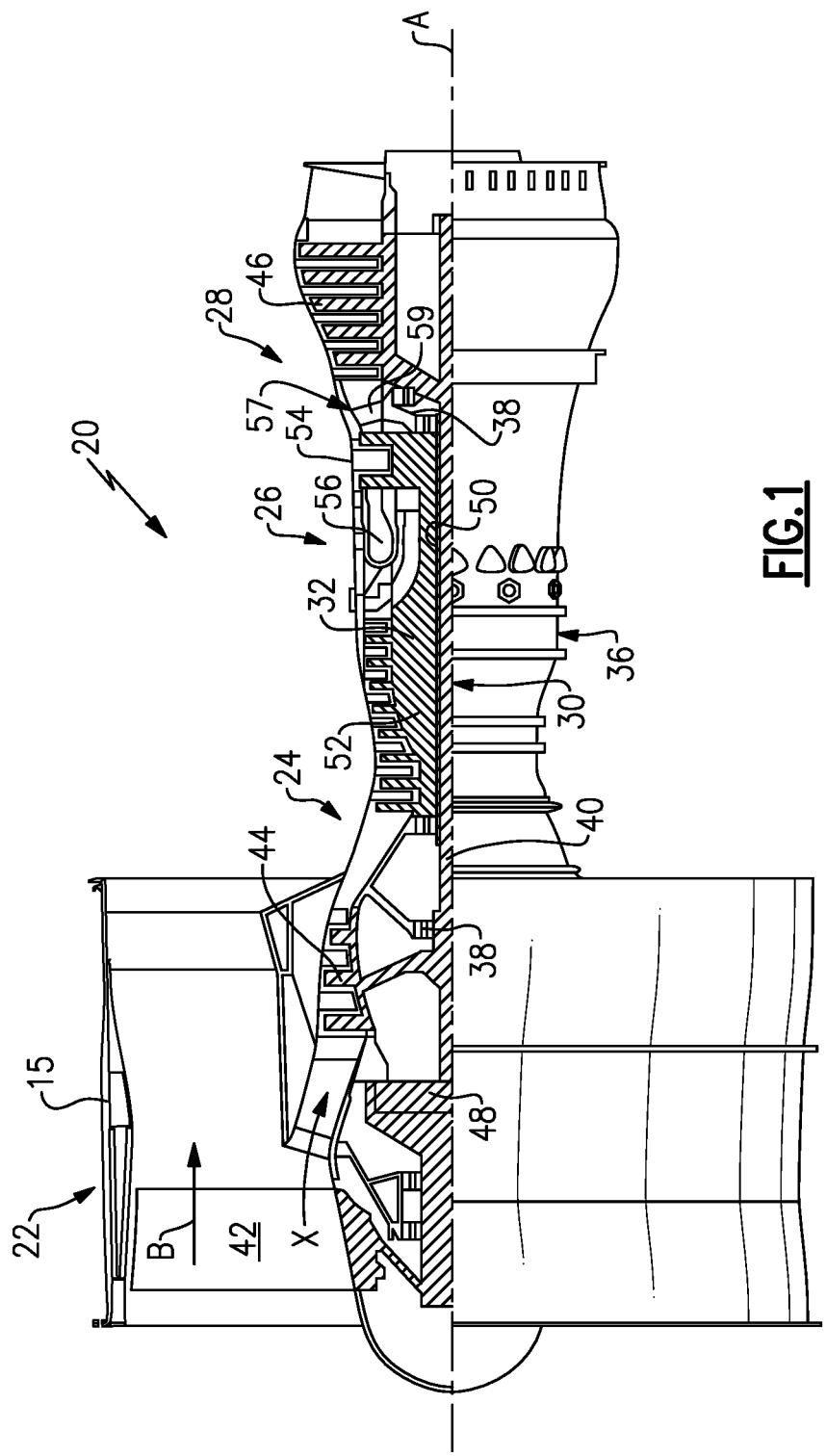
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 15, while the compressor section 24 drives air along a core flow path XC for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second.

Figure 2:
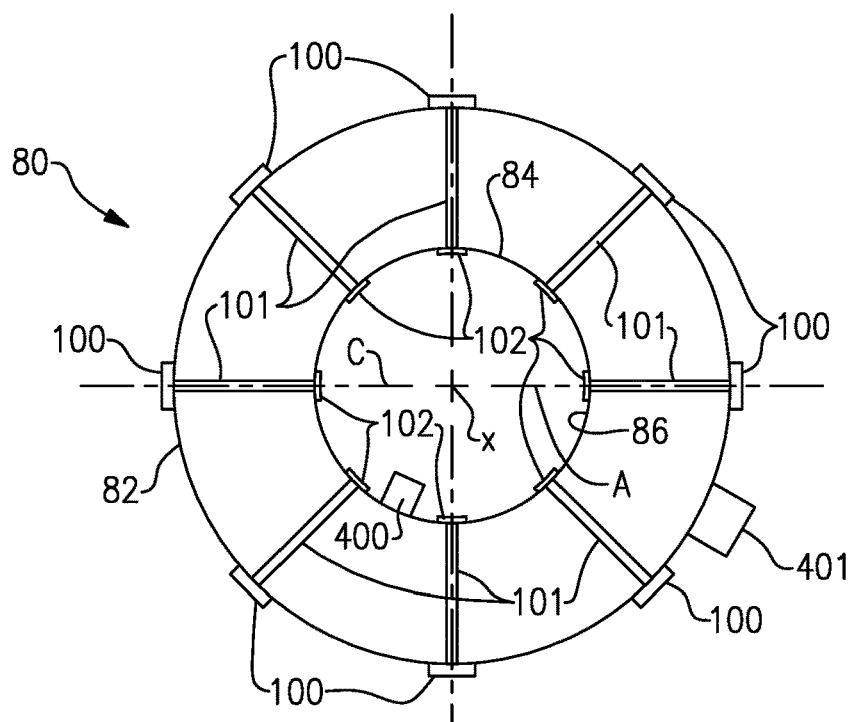
FIG. 2 shows a feature in a mid-turbine frame section.

FIG. 2 shows a portion of a casing 80, which may be at a mid-turbine section of an engine, which may be like the engine 20 of FIG. 1. An outer casing 82 is spaced from an inner casing 84. An inner bore 86 of the inner casing 84 receives a bearing mount or flange 400. The bearing 403 in the mount (see FIG. 3) mounts one of the turbine rotors, and in one embodiment a high pressure turbine rotor. Flange 400 is shown schematically, and provides the function of mounting the bearing.

A plurality of circumferentially spaced tie rods 101 have an inner pin head 102 received within apertures in the inner casing 84, and extend outwardly through apertures in the outer casing 82. Nuts 100 are secured on the tie rods, and may be tightened to adjust preload and length.

In the prior art, these tie rods have generally all been adjusted to an identical length such that a center line C of the outer casing 82 is centered on a center line A of the inner casing 84.

The outer casing 82 is mounted within the engine utilizing an outer casing flange 401, shown schematically. Thus, when the center lines C and A are aligned, the outer casing flange 401 mounts the outer casing 82 such that it is centered on the same axis x as the bearing mounted to the flange 400 within the inner casing 84. A flow area between the casings communicates the products of combustion from the high pressure turbine rotor to the low pressure turbine.

As mentioned above, under certain conditions, it becomes desirable to adjust the center line of a bearing which is mounted to the bearing flange 400. The bearing is shown in part and schematically at 403 in FIG. 3.

Figure 3:
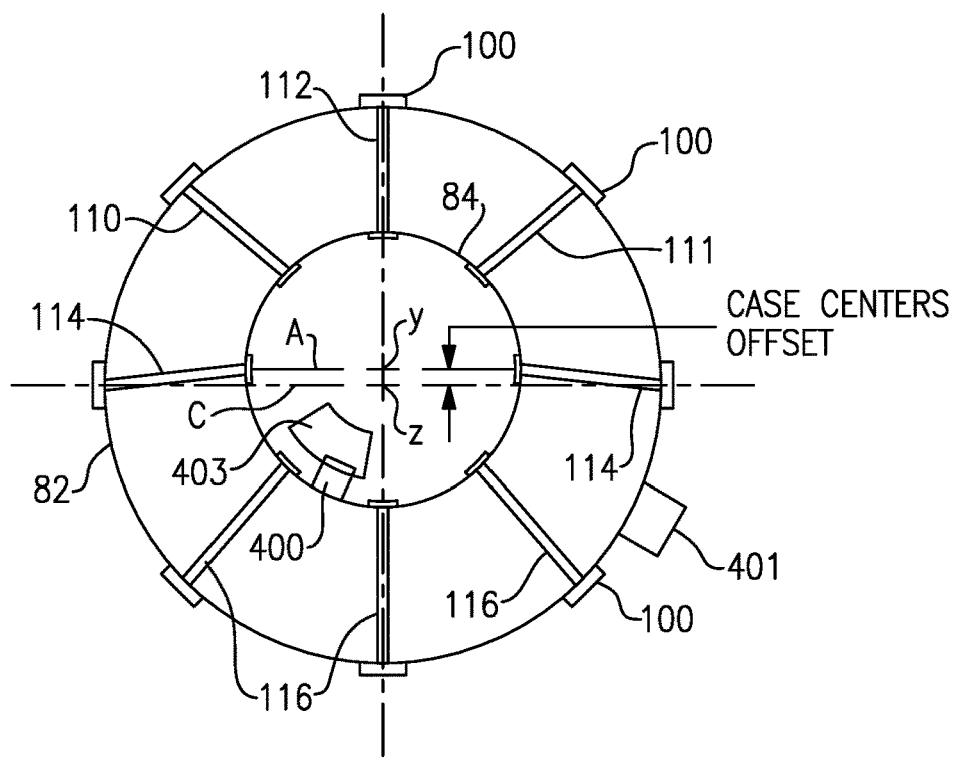
FIG. 3 shows an adjustment of the mid-turbine frame section.

Thus, for reasons that would be readily apparent to a worker of ordinary skill in the art, it may be desirable that a center line A of the bearing 403 be offset from the center line C by a distance, which is typically small, but can be determined by a worker of ordinary skill in the art. Thus, as shown in FIG. 3, by adjusting the lengths of the tie rods 101, and by tightening the nuts 100 to different extents, the center y of the inner casing 84 can be moved such that its center line A is offset from the center line C of the outer casing 82 defined by a no offset center z, which is the bearing center axis. Thus, the tie rod 112 is tightened to be shorter than it was in the FIG. 2 embodiment, as are the tie rods 110 and 111. The tie rods 114 that had been at the center line in FIG. 2, now extend at an angle, and are longer than they would have been in the FIG. 2 position. The tie rods 116 are also made to be longer. Now, with the adjustment, the center lines A and C are offset between the inner and outer casings 82 and 84.

Airfoils or vanes (see 59 in FIG. 1) are assembled together and radially fixed to the outer casing 82. These airfoils have their own inner and outer diameter flow path surfaces. One main purpose for adding the ability to adjust the eccentricity provided by this application is to better balance high pressure compressor and high pressure turbine blade tip clearances and rotating seal clearances about their periphery. As can be appreciated, seal clearances are generally measured in a few thousandths of an inch, so tight control of the clearance around a perimeter is valuable.

A designer of the gas turbine engine turbine section would recognize how to offset the desirability of properly centering the center line of bearing 403 with the change between the flow areas $F_1$ and $F_2$ However, by utilizing the adjustable tie rods 101 to provide this adjustment a worker of ordinary skill in this art is provided with a very simple way of adjusting the center line of the bearing 403, and is also provided with a system that allows it to be easily readjusted as the structure of the turbine section changes with wear and use.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine section comprising:
a turbine housing section including a radially inner case centered on a first axis, and a radially outer case spaced radially outwardly of said inner case, and centered on a second axis, said first and second axes being offset relative to each other;
a plurality of tie rods including a threaded nut received on a tie rod, with said plurality of tie rods connecting said inner and outer cases, and said plurality of tie rods being spaced circumferentially about both of said first and second axes, and said plurality of tie rods extending for distinct lengths between said inner and outer cases such that said inner and outer cases are held at a position wherein the first and second axes are offset; and
wherein said nuts are positioned radially outwardly of said outer case, and said tie rods include a pin head positioned radially inwardly of said inner case, with said nut being tightened on said tie rod to adjust the length of said tie rod and the distance between said inner and outer cases to adjust the location of said first and second axes.

2. The turbine section as set forth in claim 1, wherein a flange is positioned within said inner case to mount a bearing for mounting a turbine rotor, and such that a center line of the bearing will be offset from a center line of said outer case.

3. The turbine section as set forth in claim 1, wherein said tie rods are separate from said inner case.

4. The turbine section as set forth in claim 1, wherein at least some of the tie rods extend at an angle that is not directly radially inward.

5. The turbine section as set forth in claim 2, wherein said tie rods extend radially through apertures in said inner case.

6. A gas turbine engine comprising:
a fan, a compressor, the fan for delivering air into the compressor, and into a bypass duct, a combustor section, and a first and second turbine rotor downstream of the combustion section, the first turbine rotor being positioned upstream of the second turbine rotor, and the first turbine rotor driving a first compressor rotor which is downstream of a second compressor rotor, said second turbine rotor driving said second compressor rotor, and driving said fan, with a gear reduction positioned between said fan and said second turbine rotor, and there being a mid-turbine frame positioned between said first and second turbine rotors to communicate products of combustion downstream of said first turbine rotor to said second turbine rotor;
the mid-turbine frame including a radially inner case centered on a first axis, and a radially outer case spaced radially outwardly of said inner case, and centered on a second axis, said first and second axes being offset relative to each other, a plurality of tie rods including a threaded nut received on a tie rod, with said plurality of tie rods connecting said inner and outer cases, and said plurality of tie rods being spaced circumferentially about both of said first and second axes, and said plurality of tie rods extending for distinct lengths between said inner and outer cases such that said inner and outer cases are held at position wherein the first and second axes are offset; and
wherein said tie rods extend radially through apertures in said inner case.

7. The engine as set forth in claim 6, wherein said nuts positioned radially outwardly of said outer case, and said tie rods include a pin head positioned radially inwardly of said inner case, with said nut being tightened on said tie rod to adjust the length of said tie rod and the distance between said inner and outer cases to adjust the location of said first and second axes.

8. The engine as set forth in claim 6, wherein a flange is positioned within said inner case to mount a bearing mounting the first turbine rotor, and such that a center line of the bearing will be offset from a center line of said outer case.

9. The engine as set forth in claim 6, wherein said tie rods are separate from said inner case.

10. The engine as set forth in claim 6, wherein at least some of the tie rods extend at an angle that is not directly radially inward.

11. A method of adjusting the location of a bearing in a turbine section comprising the steps of:
connecting an inner turbine case to an outer turbine case with a plurality of tie rods with said tie rods being secured with nuts between said inner and outer turbine cases; and
determining an offset for the bearing to be mounted within said inner turbine case relative to a center line of said outer turbine case, and adjusting said nuts on said tie rods to move a center line of said inner turbine case relative to the center line of said outer turbine case to a desired location such that said bearing is at said desired location with said desired position being such that center axes of said outer turbine case and said bearing are offset.

12. The method as set forth in claim 11, wherein said tie rods are separate from said inner case.

13. The method as set forth in claim 11, wherein at least some of the tie rods extend at an angle that is not directly radially inward.

14. The method as set forth in claim 11, wherein said tie rods extend radially through apertures in said inner case.

* * * * *